United States Patent
Harada (10) Patent No.: US 9,712,726 B2
(45) Date of Patent: Jul. 18, 2017

(54) IMAGE PROCESSING DEVICE THAT SYNTHESIZES A PLURALITY OF IMAGES, METHOD OF CONTROLLING THE SAME, IMAGE PICKUP APPARATUS, AND STORAGE MEDIUM

(71) Applicant: CANON KABUSHIKI KAISHA, Tokyo (JP)

(72) Inventor: Yasuhiro Harada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 14/579,191

(22) Filed: Dec. 22, 2014

(65) Prior Publication Data

US 2015/0189205 A1 Jul. 2, 2015

(30) Foreign Application Priority Data

Dec. 26, 2013 (JP) .................................. 2013-269328

(51) Int. Cl.
   *H04N 5/217* (2011.01)
   *H04N 5/365* (2011.01)
   *H04N 5/225* (2006.01)

(52) U.S. Cl.
   CPC ......... *H04N 5/2176* (2013.01); *H04N 5/3658* (2013.01)

(58) Field of Classification Search
   CPC .................. H04N 5/232; H04N 5/3415; H04N 2013/0088; H04N 5/357; H04N 5/3577; H04N 3/1568; G06T 5/002

(Continued)

(56) References Cited

U.S. PATENT DOCUMENTS

2009/0225201 A1* 9/2009 Abe ........................ G06T 5/009
                                                          348/241
2010/0231748 A1* 9/2010 Takeda ..................... G03B 5/00
                                                          348/229.1

(Continued)

FOREIGN PATENT DOCUMENTS

CN            101444084 A        5/2009
CN            101527792 A        9/2009

(Continued)

OTHER PUBLICATIONS

Office Action issued in Chinese Application No. 201410820590.2 mailed May 18, 2017. English translation provided.

*Primary Examiner* — Kelly L Jerabek
(74) *Attorney, Agent, or Firm* — Rossi, Kimms & McDowell LLP (57) ABSTRACT

An image processing device capable of easily reducing stripe pattern noise caused by e.g. variation in power supply voltage when addition processing is performed for adding a plurality of images obtained by photographing. An image processing device synthesizes a plurality of images continuously obtained from an image pickup device. In a case where noise is added from a noise source to each of the images when thy are continuously read out from the image pickup device, timing of driving the image pickup device is controlled, such that a phase of noise added from the noise source during read-out of an image and a phase of noise added from the noise source to an image read out immediately before the image being currently read out have a predetermined relationship.

8 Claims, 8 Drawing Sheets

(58) Field of Classification Search
USPC .............................. 348/218.1, 239, 241–250
See application file for complete search history.

(56) References Cited

U.S. PATENT DOCUMENTS

| | | | |
|---|---|---|---|
| 2010/0295953 A1* | 11/2010 | Torii | G06T 5/003 348/208.4 |
| 2013/0242122 A1* | 9/2013 | Toyoda | G06T 11/00 348/208.6 |

FOREIGN PATENT DOCUMENTS

| | | |
|---|---|---|
| CN | 101889452 A | 11/2010 |
| JP | 2010141799 A | 6/2010 |

* cited by examiner

IMAGE PROCESSING DEVICE THAT SYNTHESIZES A PLURALITY OF IMAGES, METHOD OF CONTROLLING THE SAME, IMAGE PICKUP APPARATUS, AND STORAGE MEDIUM

BACKGROUND OF THE INVENTION

Field of the Invention

The present invention relates to an image processing device that synthesizes a plurality of images, a method of controlling the same, an image pickup apparatus, and a storage medium.

Description of the Related Art

In general, in an image pickup apparatus, such as an electronic camera, a solid-state image pickup device (hereafter simply referred to as the image pickup device), such as a CCD or CMOS image sensor, is used. In this image pickup apparatus, various noises which cause degradation of the quality of an image are generated during the process of converting an optical image to an electric signal (analog signal) by the image pickup device. Examples of typical noise include reset noise generated in pixels and circuits for reading out signals from the pixels, and random noise, such as dark current generated in a pixel area, which varies whenever an image pickup operation is performed.

Further, within or in the vicinity of the body of the image pickup apparatus, there are provided components which can be noise sources that periodically change the power supply voltage of the image pickup device. If these noise sources operate during the signal read-out operation performed by the image pickup device, the power supply voltage supplied to the image pickup device is varied by the power supply variation caused by the noise sources and electromagnetic waves generated from the same.

In general, it is known that these noise sources are each driven at a frequency specific to each component or part thereof, and hence the power supply voltage of the image pickup device is periodically varied, and the variation in power supply voltage appears on an image as periodic horizontal stripe pattern noise.

By the way, there has been developed an image pickup apparatus that performs a high-speed read-out operation which enables a plurality of image pickup operations and signal processing operations to be performed within a short time period. In such an image pickup apparatus, one image is generated by performing addition processing for adding a plurality of images obtained by performing a plurality of image pickup operations at high speed to thereby average random noise, such as dark noise, included in each image. Therefore, compared with an image obtained by one image pickup operation, a synthesized image which is finally obtained is reduced in random noise, and is thereby improved in image quality.

On the other hand, the horizontal stripe pattern noise caused by a noise source which periodically changes the power supply voltage is sometimes increased in a synthesized image depending on a position on each image where the horizontal stripe pattern noise is generated before being subjected to addition processing.

To solve the problem of the horizontal stripe pattern noise caused by a noise source which periodically changes the power supply voltage, there has been proposed an image pickup apparatus that reduces the horizontal stripe pattern noise by detecting the frequency of the noise source, and changing a drive frequency of a drive signal for driving the image pickup device, according to the detected frequency (see Japanese Patent Laid-Open Publication No. 2010-141799).

However, in the image pickup apparatus disclosed in Japanese Patent Laid-Open Publication No. 2010-141799, since the drive frequency of the image pickup device is changed according to the frequency of the noise source, if a plurality of noise sources exist, it is necessary to change the drive frequency of the image pickup device on a noise source-by-noise source basis. This makes it difficult to change the drive frequency of the image pickup device when a plurality of noise sources exist, and in this case, the horizontal stripe pattern noise cannot be reduced.

SUMMARY OF THE INVENTION

The present invention provides an image processing device that is capable of easily reducing stripe pattern noise caused by e.g. variation in power supply voltage in a case where addition processing is performed for adding a plurality of images obtained by photographing, an image pickup apparatus, and a storage medium.

In a first aspect of the present invention, there is provided image processing device that synthesizes a plurality of images continuously obtained from an image pickup device that outputs an image based on an optical image, to thereby obtain a synthesized image, comprising a drive unit configured to drivingly control the image pickup device to thereby continuously read out the plurality of images from the image pickup device, an image processing unit configured to perform processing for synthesizing the plurality of images to thereby obtain the synthesized image, and a control unit configured to control, in a case where noise is added from a noise source to each of a plurality of images when the plurality of images are continuously read out from the image pickup device, timing of driving the image pickup device by the drive unit, such that a phase of noise added from the noise source during read-out of an image and a phase of noise added from the noise source to an image read out immediately before the image being currently read out have a predetermined relationship.

In a second aspect of the present invention, there is provided an image pickup apparatus including an image pickup device that has an optical image formed therein which is incident through an image pickup optical system, and outputs an image signal based on the optical image, and an image processing device that synthesizes a plurality of images continuously output from the image pickup device to thereby obtain a synthesized image, wherein the image processing device comprises a drive unit configured to drivingly control the image pickup device to thereby continuously read out the plurality of images from the image pickup device, an image processing unit configured to perform processing for synthesizing the plurality of images to thereby obtain the synthesized image, and a control unit configured to control, in a case where noise is added from a noise source to each of a plurality of images when the plurality of images are continuously read out from the image pickup device, timing of driving the image pickup device by the drive unit, such that a phase of noise added from the noise source during read-out of an image and a phase of noise added from the noise source to an image read out immediately before the image being currently read out have a predetermined relationship.

In a third aspect of the present invention, there is provided a method of controlling an image processing device that synthesizes a plurality of images continuously obtained from an image pickup device that outputs an image based on an optical image, to thereby obtain a synthesized image, comprising drivingly controlling the image pickup device to thereby continuously read out the plurality of images from the image pickup device, performing processing for synthesizing the plurality of images to thereby obtain the synthesized image, and controlling, in a case where noise is added from a noise source to each of a plurality of images when the plurality of images are continuously read out from the image pickup device, timing of driving the image pickup device, such that a phase of noise added from the noise source during read-out of an image and a phase of noise added from the noise source to an image read out immediately before the image being currently read out have a predetermined relationship.

In a fourth aspect of the present invention, there is provided a non-transitory computer-readable storage medium storing a computer-executable control program for causing a computer to execute a method of controlling an image processing device that synthesizes a plurality of images continuously obtained from an image pickup device that outputs an image based on an optical image, to thereby obtain a synthesized image, wherein the method comprises drivingly controlling the image pickup device to thereby continuously read out the plurality of images from the image pickup device, performing processing for synthesizing the plurality of images to thereby obtain the synthesized image; and controlling, in a case where noise is added from a noise source to each of a plurality of images when the plurality of images are continuously read out from the image pickup device, timing of driving the image pickup device, such that a phase of noise added from the noise source during read-out of an image and a phase of noise added from the noise source to an image read out immediately before the image being currently read out have a predetermined relationship.

According to the present invention, in a case where synthesizing processing, such as addition processing, is performed for synthesizing a plurality of images obtained by photographing, it is possible to easily reduce stripe pattern noise.

Further features of the present invention will become apparent from the following description of exemplary embodiments (with reference to the attached drawings).

BRIEF DESCRIPTION OF THE DRAWINGS

FIGS. 4A and 4B are diagrams useful in explaining the influence of horizontal stripe noise on addition processing for adding two images in the digital camera shown in FIG. 1, in which

FIGS. 6A and 6B are timing diagrams useful in explaining read-out control performed by the timing controller shown in FIG. 5, in which

FIGS. 8A to 8D are diagrams useful in explaining a phase of a noise signal detected when photographing is performed by the digital camera equipped with the image processing device according to the second embodiment, in which

DESCRIPTION OF THE EMBODIMENTS

The present invention will now be described in detail below with reference to the accompanying drawings showing embodiments thereof.

Figure 1:
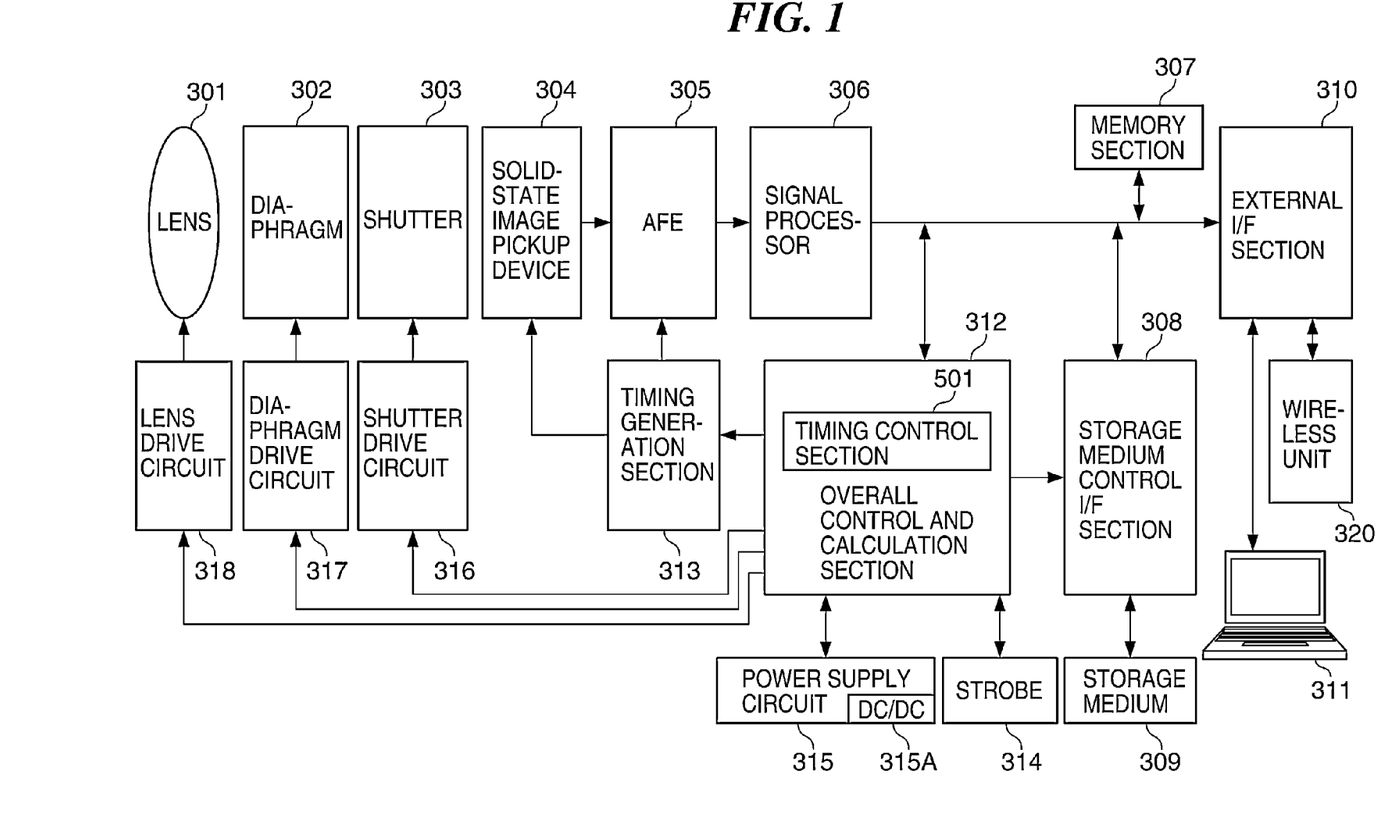
FIG. 1 is a block diagram of a digital camera as an image pickup apparatus equipped with an image processing device according to a first embodiment of the present invention.

FIG. 1 is a block diagram of an example of an image pickup apparatus equipped with an image processing device according to a first embodiment of the present invention.

The illustrated image pickup apparatus is e.g. a digital camera (hereafter simply referred to as the camera), and includes a solid-state image pickup device (hereafter simply referred to as the image pickup device) 304, such as a CMOS image sensor. A shutter 303, a diaphragm 302, and a photographic lens unit (hereafter simply referred to as the lens) 301 are arranged on the front side (incident light side) of the image pickup device 304, in the mentioned order. The lens 301, the diaphragm 302, and the shutter 303 constitute an image pickup optical system.

An optical image incident through the lens 301 has the light amount thereof adjusted by the diaphragm 302 and the shutter 303, and is formed on the image pickup device 304. The image pickup device 304 photoelectrically converts the optical image to an electric signal (analog image signal). The analog image signal output from the image pickup device 304 (also referred to as the image pickup signal) is provided to an analog front end circuit (AFE) 305. The AFE 305 performs predetermined image pickup signal processing on the image pickup signal, and converts the image pickup signal from analog to digital to thereby output digital image data. Then, the image data is sent to a signal processor 306.

The signal processor 306 performs various correction processing on the received image data, and performs data compression processing as needed to thereby generate processed image data. Then, the processed image data is temporarily stored in a memory section 307. Further, the signal processor 306 performs image synthesis processing for performing addition processing (synthesis processing) on a plurality of images (image data) which are continuously obtained from the image pickup device 304 as a result of photographing, to thereby generate synthesized image data.

A timing pulse is supplied from a timing generation section 313 to the image pickup device 304, the AFE 305, and the signal processor 306. The timing generation section 313 generates the timing pulse according to a clock signal CLK_CMOS, described hereinafter, under the control of an overall control and calculation section 312.

The overall control and calculation section 312 performs various calculation processing, and controls the overall operation of the camera. An external apparatus, such as an external computer 311, is connected to an external interface (I/F) section 310, and the external interface section 310 performs communication with the external apparatus. The external interface section 310 is also capable of wirelessly communicating with an external apparatus, e.g. by transmitting image data via a wireless unit 320.

A storage medium 309 is connected to a storage medium control interface (I/F) section 308 in a removable manner. When the storage medium 309 is connected to the storage medium control interface (I/F) section 308, the storage medium control interface (I/F) section 308 records image data in the storage medium 309, and reads out image data recorded in the storage medium 309. Note that the storage medium 309 is implemented e.g. by a semiconductor memory.

A strobe section 314 performs projection of AF (auto focus) auxiliary light and flash light control under the control of the overall control and calculation section 312. A power supply circuit 315 includes e.g. a DC-DC converter circuit 315A for converting a battery voltage to a desired voltage, and supplies the voltage required for the operation of the camera to components of the camera including the storage medium 309 over a required time period. The DC-DC converter circuit 315A is driven based on a clock signal CLK_DCDC, referred to hereinafter.

A lens drive circuit 318 drivingly controls the lens 301 under the control of the overall control and calculation section 312, and a diaphragm drive circuit 317 drivingly controls the diaphragm 302. Similarly, a shutter drive circuit 316 drivingly controls the shutter 303 under the control of the overall control and calculation section 312.

As described above, the camera shown in FIG. 1 is provided with the strobe 314, the DC-DC converter circuit 315A for performing voltage conversion, and the actuator drive circuits (the lens drive circuit 318, the diaphragm drive circuit 317, and the shutter drive circuit 316) for driving the lens 301, the diaphragm 302, and the shutter 303. Further, the camera is provided with the communication units (the external interface section 310 and the wireless unit 320) for communicating with external apparatuses. That is, within or in the vicinity of the body of the illustrated camera, there are provided components which can be noise sources that periodically change the power supply voltage of the image pickup device 304.

If these noise sources operate during the signal read-out operation performed by the image pickup device 304, the power supply voltage supplied to the image pickup device 304 is varied e.g. by power supply variation caused by the noise sources and electromagnetic waves generated from the same. These noise sources are each driven at a frequency specific to each component or part thereof, and hence the power supply voltage of the image pickup device 304 is periodically varied, so that the variation in power supply voltage appears on an image as periodic horizontal stripe pattern noise.

Note that not only the noise sources appearing in FIG. 1, but also a device or a component operation of which can vary the magnetic field in the vicinity of the power source or the image pickup device 304 of the camera can be a noise source.

Figure 2:
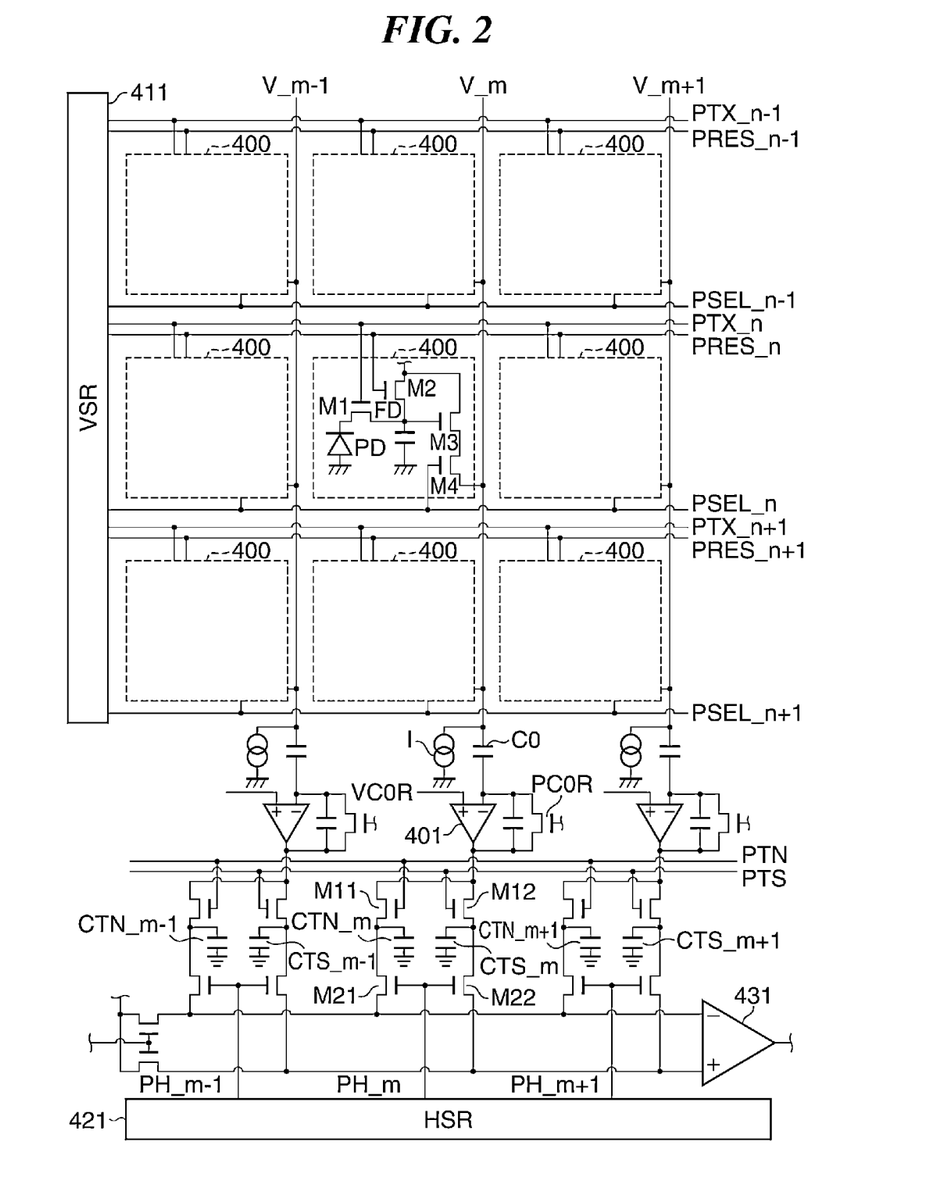
FIG. 2 is a diagram showing an equivalent circuit of an image pickup device appearing in FIG. 1.

FIG. 2 is a diagram showing an equivalent circuit of the image pickup device 304 appearing in FIG. 1.

Referring to FIG. 2, the circuit elements constituting the image pickup device 204 are formed on a semiconductor substrate, such as single crystal silicon, by using a semiconductor integrated circuit-manufacturing technique. In this example, it is assumed that the number of rows and columns of a pixel array are n rows×m columns (each of n and m represents an integer equal to 2 or larger). Although the illustrated example shows the pixel array having three rows×three columns (n=m=3), the number of rows and the number of columns of the pixel array are not limited to the illustrated example.

The image pickup device 304 includes a plurality of unit pixels 400 arranged in a two-dimensional matrix, and a pixel section is formed by these unit pixels 400. Each unit pixel 400 has a photodiode PD, and the photodiode PD receives light and generates an optical signal which is an electric signal. In the illustrated example, the photodiode PD has its anode grounded.

The photodiode PD has its cathode connected to a gate of an amplifier MOS (Metal Oxide Semiconductor) M3, via a transfer MOS M1 for transferring optical signal charges accumulated in the photodiode PD, and a floating diffusion FD. A reset MOS M2 for resetting the amplifier MOS M3 has its source connected to the gate of the amplifier MOS M3 via the floating diffusion FD, and has its drain connected to a reset power supply. Further, a drain of the amplifier MOS M3 is also connected to the reset power supply. Further, as is clear from the above and FIG. 2, a drain of the transfer MOS M1 and the gate of the amplifier MOS M3 are connected to the floating diffusion FD. Further, the amplifier MOS M3 has its source connected to a drain of a selection MOS M4.

The gates of the transfer MOSs M1 of the unit pixels 400 of the n-th row are connected to a row transfer line PTX_n extending in a horizontal direction in FIG. 2. Further, the gates of the reset MOSs M2 of the unit pixels 400 of the n-th row are connected to a row reset line PRES_n extending in the horizontal direction in FIG. 2. Further, the gates of the selection MOSs M4 of the unit pixels 400 of the n-th row are connected to a row selection line PSEL_n extending in the horizontal direction in FIG. 2.

The above-mentioned row transfer line PTX_n, row reset line PRES_n, and row selection line PSEL_n are connected to a vertical scanning circuit (VSR) 411. The vertical scanning circuit 411 supplies a signal voltage for controlling transfer of a pixel signal to the row transfer line PTX_n at a timing described hereinafter. Further, the vertical scanning circuit 411 supplies a signal voltage for controlling reset of the unit pixels 400 to the row reset line PRES_n at a timing described hereinafter. Further, the vertical scanning circuit 411 supplies a signal voltage for selecting a pixel row which performs signal transfer, to the row selection line PSEL_n at a timing described hereinafter.

As shown in FIG. 2, sources of the amplifier MOSs M3 of the unit pixels 400 of the m-th column are connected to a vertical signal line V_m extending in a longitudinal direction via the selection MOSs M4. The vertical signal line V_m is connected to a constant current source I which is a load unit, and is connected to a clamp capacitance C0. Further, the clamp capacitance C0 is connected to an inverting input terminal of an operational amplifier 401.

The operational amplifier 401 has a non-inverting input terminal connected to a clamp voltage VC0R, and an output terminal connected to one terminal of a capacitance CTN_m for temporarily holding a reference signal (serving as a reference for an image pickup signal) via a reference signal transfer switch M11. Further, the output terminal of the operational amplifier 401 is connected to one terminal of a capacitance CTS_m for temporarily holding an optical signal (image pickup signal) via an optical signal transfer switch M12.

The other terminals of the reference signal holding capacitance CTN_m and the optical signal holding capacitance CTS_m are grounded. A junction point between the reference signal transfer switch M11 and the reference signal-holding capacitance CTN_m, and a junction point between the optical signal transfer switch M12 and the optical signal-holding capacitance CTS_m are connected to a differential amplifier circuit 431 for determining a difference between the optical signal and the reference signal, via a horizontal transfer switch M21 and a horizontal transfer switch M22, respectively.

Note that the other vertical signal lines V_m−1 and V_m+1 are each similarly provided with an associated read-out circuit.

The gates of the reference signal transfer switches M11 of the respective columns are commonly connected to a first transfer signal input terminal PTN. Further, the gates of the optical signal transfer switches M12 of the respective columns are commonly connected to a second transfer signal input terminal PTS. The first transfer signal input terminal PTN and the second transfer signal input terminal PTS are supplied with signal voltages at respective timings, referred to hereinafter.

The gates of the horizontal transfer switch M21 and the horizontal transfer switch M22 of the m-th column are connected to a horizontal scanning circuit (HSR) 421 via a column selection line PH_m. Note that column selection lines PH_m−1 and PH_m+1 are similarly connected to the horizontal scanning circuit 421.

Figure 3:
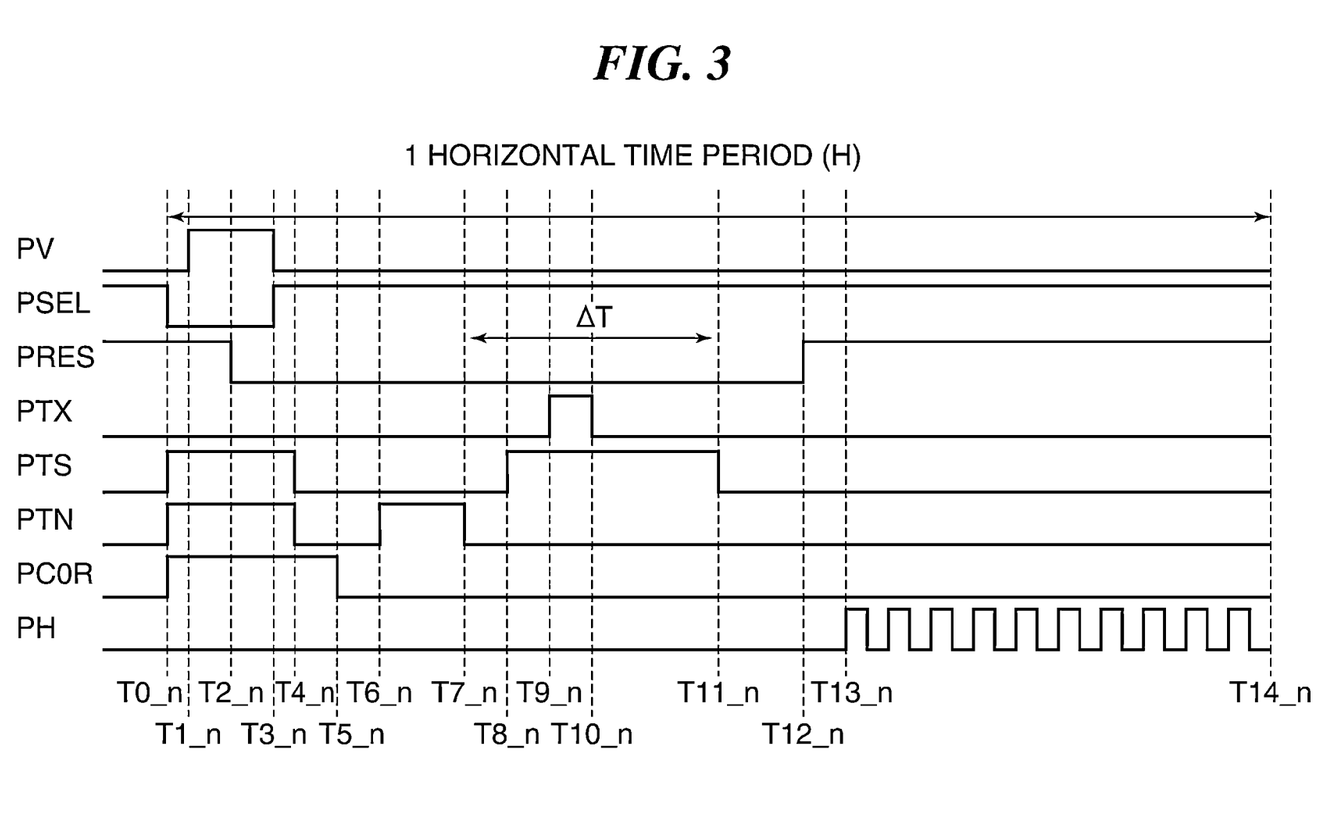
FIG. 3 is a timing diagram showing a drive pattern useful in explaining signal read-out operations performed by the image pickup device shown in FIG. 2.

FIG. 3 is a timing diagram showing a drive pattern, which is useful in explaining a signal read-out operation performed by the image pickup device 304 shown in FIG. 2.

When reading out signals from the image pickup device 304, reading is started from the first row of the image pickup device 304 and is then sequentially performed from the second, third, and fourth rows, such that when the operation for reading out signals from one row is finished, the operation for reading out signals from the next row is started.

Here, with reference to FIGS. 2 and 3, the operation for reading out signals will be described by paying attention to the n-th row of the image pickup device 304.

Now, at a time T0_n, a row selection pulse PSEL becomes the low level (L level) to turn off the pixel selection MOSs M4 of a row from which signals have been read out just before, i.e. the (n−1)-th row, whereby selection of the unit pixels 400 of the (n−1)-th row is released. At the same time, a clamp pulse PC0R becomes a high level (H level) to start resetting the clamp capacitance C0. Further, transfer signal input pulses PTS and PTN each become an H level to start resetting the reference signal-holding capacitance CTN and the optical signal-holding capacitance CTS.

At a time T1_n, a row feed pulse PV is input to the vertical scanning circuit 411, i.e. becomes an H level, to advance the row selected for reading out signals. In this example, the selected row is advanced from the (n−1)-th row to the n-th row.

At a time T2_n, a row reset pulse PRES becomes an L level to release the resetting of the floating diffusion FD, whereby the reference potential of the floating diffusion FD is determined.

At a time T3_n, the row feed pulse PV becomes an L level. Further, the row selection pulse PSEL becomes an H level to turn on the pixel selection MOS M4, whereby the unit pixels 400 of the n-th row are selected.

At a time T4_n, the transfer signal input pulses PTS and PTN each become an L level to terminate the resetting of the optical signal-holding capacitance CTS and the reference signal-holding capacitance CTN, whereby the reference potentials of the optical signal-holding capacitance CTS and the reference signal-holding capacitance CTN are determined.

At a time T5_n, the clamp pulse PC0R becomes an L level to hold the reference potential VC0R at a potential of the capacitance C0.

At a time T6_n, the transfer signal input pulse PTN becomes an H level to output the potential (voltage) of the floating diffusion FD to the reference signal-holding capacitance CTN.

At a time T7_n, the transfer signal input pulse PTN becomes the L level (hold timing), to hold the potential (voltage) of the floating diffusion FD detected at this time in the noise signal-holding capacitance CTN as a reference signal.

At a time T8_n, the transfer signal input pulse PTS becomes the H level to output the potential (voltage) of the floating diffusion FD to the optical signal-holding capacitance CTS.

At a time T9_n, the row transfer line PTX becomes an H level during a time period over which the transfer signal input pulse PTS is at the H level, to turn on the transfer MOS M1, whereby electric charges accumulated in the photodiode PD are transferred to the floating diffusion FD.

At a time T10_n, the row transfer line PTX becomes an L level to turn off the transfer MOS M1, whereby transfer of the electric charges to the floating diffusion FD is terminated.

At a time T11_n, the transfer signal input pulse PTS becomes the L level to hold the potential of the floating diffusion FD detected at this time in the optical signal-holding capacitance CTS as an optical signal (image pickup signal).

The row reset pulse PRES becomes an H level at a time T12_n to start resetting the floating diffusion FD.

At a time T13_n, a column feed pulse PH is input to the horizontal scanning circuit 421, to sequentially input the column transfer pulse to the column selection lines PH_m−1 to PH_m+1, in a manner starting from the first column and terminating in the last column of the read-out area, and at a time T14_n, the input of the column feed pulse PH up to the last column is completed. As a consequence, the signals held in the optical signal-holding capacitance CTS and the reference signal-holding capacitance CTN are sequentially sent to the differential amplifier circuit 431 on a column-by-column basis. Then, a signal acquired by amplifying a difference between the optical signal and the reference signal by the differential amplifier circuit 431 is output from an output terminal of the image pickup device 304 as an image signal.

The above is the operation for reading out signals from the n-th pixel row, and a time period during which the operation is performed is defined as one horizontal time period (H). After the pixel signals have been read out from the n-th row, the read-out operation is shifted to the (n+1)-th row. Note that also in the read-out operation for reading out signals from each of pixel rows other than the n-th row, the same read-out operation as that performed for the n-th row is repeatedly executed, and when the operation for reading out signals from each row is finished, the read-out operation is shifted to the operation for reading out signals from the next row.

The above-described operation is repeatedly performed until the signals are read out from all the pixel rows of the image pickup device 304, whereby the image signals of one frame are read out from the image pickup device 304.

In the illustrated camera, when addition processing is performed on a plurality of images (i.e. image data items), the phase of the noise source, which periodically varies for each one image pickup operation, is controlled to be a predetermined phase at the start of reading out signals from the image pickup device 304. Although the following description will be given of the switching operation of the DC-DC converter circuit 315A of the power supply circuit 315 as an example of the noise source which periodically varies within the camera, the noise source is not limited to the DC-DC converter circuit 315A.

Assuming that a drive frequency of the drive clock CLK_DCDC for driving the DC-DC converter circuit 315A is f (MHz), in this case, when reading out signals from the image pickup device 304, noise having the frequency f (MHz) is mixed in a signal read out from the image pickup device 304 due to the influence of driving of the DC-DC converter circuit 315A. More specifically, sine-wave noise y(t) having the frequency f and an initial phase θ, expressed by the following equation (1), is mixed in the signal read out from the image pickup device 304:

$$y(t)=\sin(2\pi ft+\theta) \quad (1)$$

wherein t represents a time period elapsed after the time of the initial phase θ.

In FIG. 3, one horizontal time period is represented by H, and a time difference between the timing (time) T7_n in which the transfer signal input pulse PTN becomes the L level to hold the reference signal in the holding capacitance CTN, and the timing (time) T11_n in which the transfer signal input pulse PTS becomes the L level to hold the optical signal (image pickup signal) in the holding capacitance CTS is represented by ΔT.

Assuming that the influence of the noise having the frequency f, which is mixed during the read-out operation, on detection of a difference in the n-th row is L(n), L(n) is expressed by the following equation (2):

$$L(n)=\sin(2\pi f(Hn+\Delta T)+\theta)-\sin(2\pi fHn+\theta) \quad (2)$$

Using the formula of a trigonometric function, the equation (2) can be transformed into the following equation (3):

$$L(n)=2\times\cos(\pi f(2Hn+\Delta T)+\theta)\times\sin(\pi f\Delta T) \quad (3)$$

It is known from the equation (3) that in a case where the noise y(t) having the noise frequency f and the initial phase θ is mixed during the read-out operation, the output signal is varied for each row to generate a horizontal stripe noise. Further, it is found that the phase of the horizontal stripe noise on the screen of the photographed image is determined according to the initial phase θ of the drive clock signal for driving the noise source.

Figure 4A:
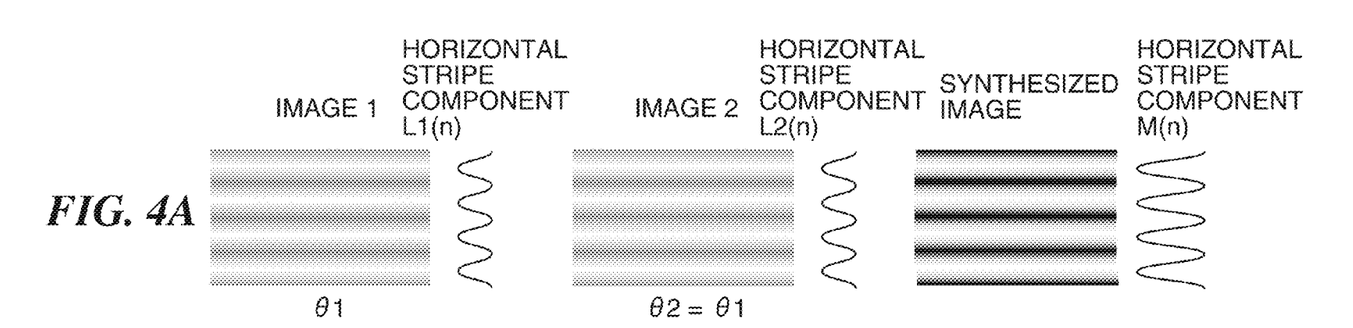
FIG. 4A shows the influence of noise in a case where the first image and the second image each have the same phase of the horizontal stripe noise.
Figure 4B:
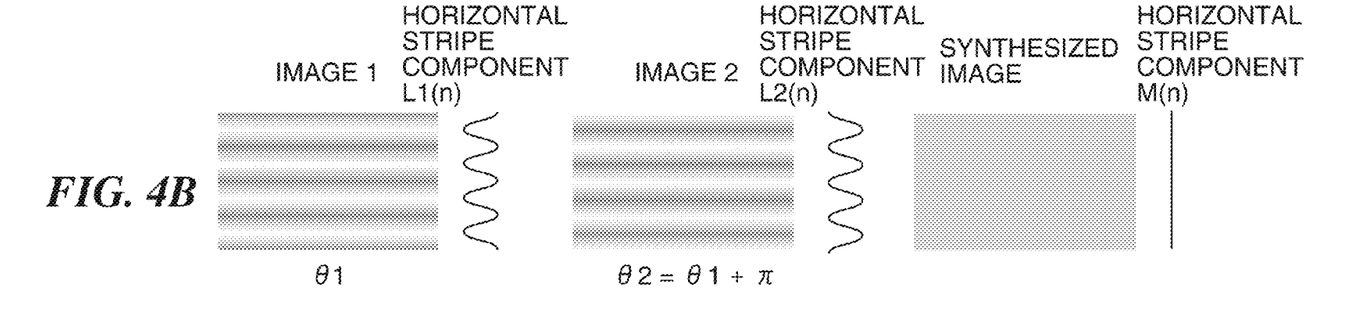
FIG. 4B shows the influence of noise in a case where the first image and the second image have the inverted phases of the horizontal stripe noise.

FIGS. 4A and 4B are diagrams useful in explaining the influence of horizontal stripe noise on addition processing for adding two images in the digital camera shown in FIG. 1, in which FIG. 4A shows the influence of noise in a case where the first image and the second image each have the same phase of the horizontal stripe noise, and FIG. 4B shows the influence of noise in a case where the first image and the second image have the inverted phases of the horizontal stripe noise.

Here, in performing addition processing, the initial phase of the drive clock signal for driving the noise source when photographing the first image (image 1) is represented by θ1, and the initial phase of the drive clock signal for driving the noise source when photographing the second image (image 2) is represented by θ2. Further, the horizontal stripe noise component generated when photographing the first image and the horizontal stripe noise component generated when photographing the second image, which are determined by the equation (3), are represented by L1(n) and L2(n), respectively. Furthermore, the horizontal stripe noise component after addition processing is represented by M(n). The noise component M(n) is determined by M(n)=L2(n)+L1(n).

In the illustrated example in FIG. 4A, a phase difference between the initial phases θ1 and θ2 of the drive clock signal for driving the noise source is equal to 0. That is, θ2=θ1 holds. In this case, L1(n)=L2(n) is obtained from the equation (3), and hence there is obtained M(n)=2×L2(n). Therefore, it is known that when addition processing is performed in the case where the phases of the horizontal stripe noise of the first image and the second image coincide with each other, the horizontal stripe noise is doubled in the image obtained by addition processing.

In the illustrated example in FIG. 4B, a phase difference between the initial phases θ1 and θ2 of the drive clock signal for driving the noise source is equal to π. That is, θ2=θ1+π holds. In this case, L1(n)=−L2(n) is obtained from the equation (3), and hence there is obtained M(n)=0. Therefore, it is known that when addition processing is performed in the case where the phases of the horizontal stripe noise of the first image and the second image have an inverted relationship, the horizontal stripe noise becomes hardly noticeable in the image obtained by addition processing.

In view of this, the timing of driving the image pickup device 304 is controlled such that the phase of the horizontal stripe noise when performing addition processing is inverted whenever one image is photographed.

Figure 5:
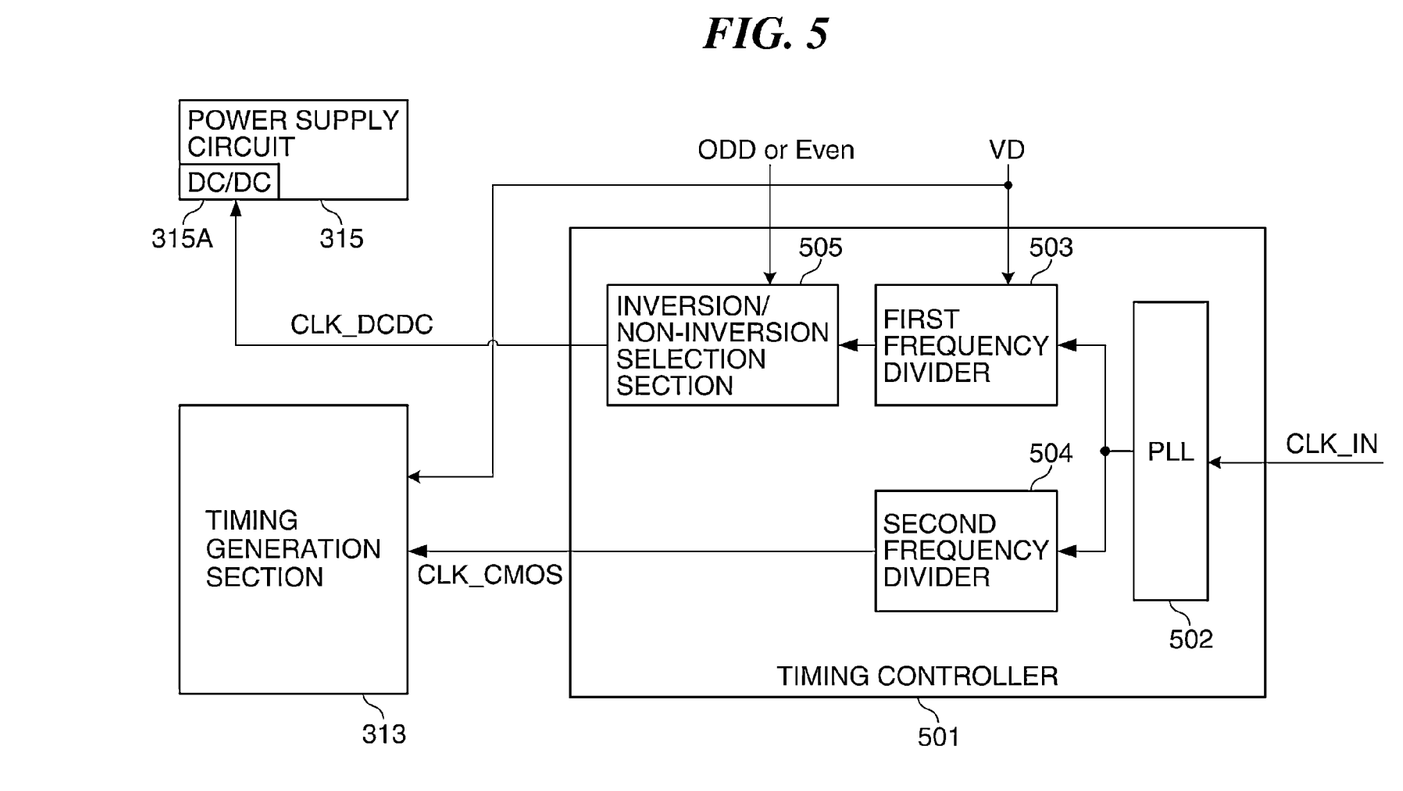
FIG. 5 is a block diagram of a timing controller used in the digital camera.

FIG. 5 is a block diagram of a timing controller used in the camera. Note that the timing controller, denoted by reference numeral 501, is incorporated in the overall control and calculation section 312 shown in FIG. 1.

Referring to FIG. 5, the timing controller 501 includes a PLL 502, first and second frequency dividers 503 and 504, and an inversion/non-inversion selection section 505. The PLL 502 generates a clock (referred to as the PLL clock) CLK having a frequency which is an integral multiple of that of a reference clock CLK_IN. The first frequency divider 503 generates a clock signal (referred to as the first clock signal or first drive signal) CLK_DCDC having a predetermined first frequency, by dividing the PLL clock CLK. Then, the first frequency divider 503 supplies the generated first clock signal CLK_DCDC to the power supply circuit 315 via the inversion/non-inversion selection section 505.

The second frequency divider 504 generates a clock signal (referred to as the second clock signal or second drive signal) CLK_CMOS having a predetermined second frequency, by dividing the PLL clock CLK, and supplies the generated second clock signal CLK_CMOS to the timing generation section 313.

The timing controller 501 can finalize the phase of the first clock signal CLK_DCDC according to an external signal. More specifically, the first frequency divider 503 resets (i.e. initializes) a count value counted by a counter circuit incorporated therein according to a vertical synchronization signal VD provided from the outside. By this reset operation, the first frequency divider 503 finalizes the initial phase of the first clock signal CLK_DCDC for driving the DC-DC converter circuit 315A of the power supply circuit 315, which is a noise source, and synchronizes the first clock signal CLK_DCDC with the vertical synchronization signal VD.

The timing generation section 313 receives the vertical synchronization signal VD and the second clock signal CLK_CMOS and generates a timing pulse (control signal) for driving the image pickup device 304. That is, the timing generation section 313 outputs a control signal (i.e. drive signal) for controlling the signal read-out operation performed by the image pickup device 304, described with reference to FIG. 3.

The vertical synchronization signal VD output from the overall control and calculation section 312 is used for controlling the start timing of reading out signals from the image pickup device 304.

The inversion/non-inversion selection section 505 outputs the first clock signal, which is output from the first frequency divider 503, in a state non-inverted or inverted depending on whether an image to be photographed is an odd-numbered or even-numbered image when subjected to addition processing. That is, the inversion/non-inversion selection section 505 selects an inverted signal or a non-inverted signal according to whether an odd-numbered or even-numbered image is to be photographed.

More specifically, the overall control and calculation section 312 outputs a selection signal ODDorEVEN indicative of an odd-numbered or even-numbered image. Then, the inversion/non-inversion selection section 505 outputs the inverted or non-inverted first clock signal according to the selection signal ODDorEVEN.

In this example, the overall control and calculation section 312 sets the selection signal ODDorEVEN to an H level when an odd-numbered image is to be photographed. On the other hand, if an even-numbered image is to be photographed, the overall control and calculation section 312 sets the selection signal ODDorEVEN to an L level. If the selection signal ODDorEVEN is at the H level, the inversion/non-inversion selection section 505 directly outputs the first clock signal CLK_DCDC input thereto. If the selection signal ODDorEVEN is at the L level, the inversion/non-inversion selection section 505 outputs the first clock signal CLK_DCDC input thereto, via e.g. an inverter (not shown) (i.e. outputs the first clock signal CLK_DCDC after inverting the same). Hereafter, the inverted first clock signal CLK_DCDC is referred to as the first inverted clock signal CLK_DCDC.

Thus, when performing addition processing of a plurality of images, the phase of the drive clock signal for driving the noise source at the start of reading out signals is finalized, and further, the first clock signal CLK_DCDC is inverted when each even-numbered image is to be photographed.

Figure 6A:
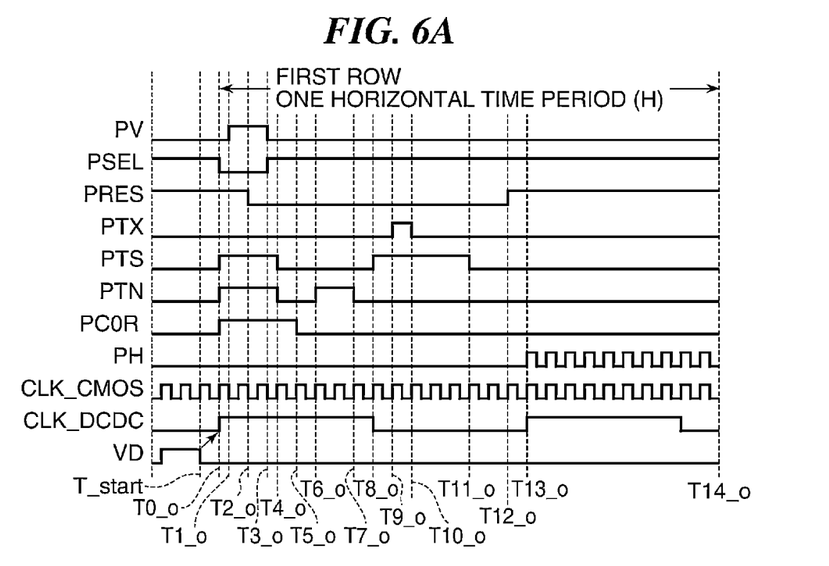
FIG. 6A is a timing diagram showing the read-out control performed when photographing an odd-numbered image.
Figure 6B:
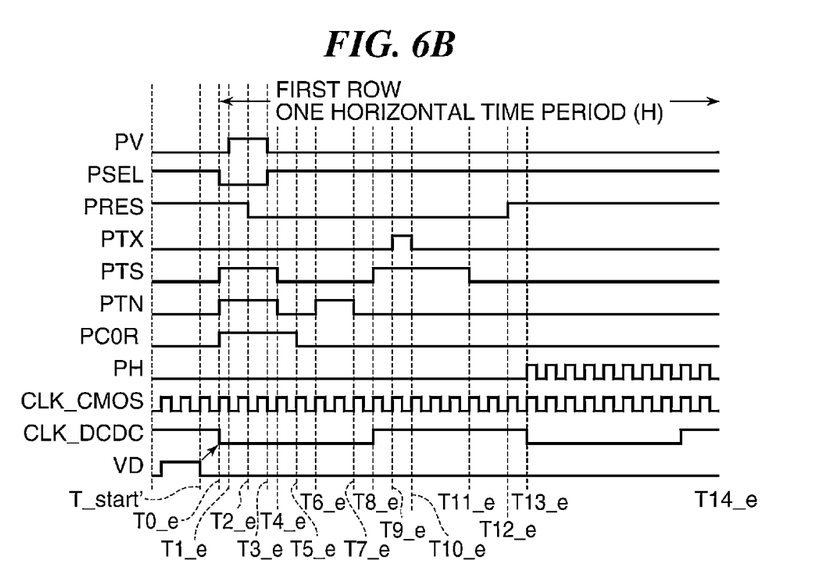
FIG. 6B is a timing diagram showing the read-out control performed when photographing an even-numbered image.

FIGS. 6A and 6B are timing diagrams useful in explaining read-out control performed by the timing controller 501 shown in FIG. 5, in which FIG. 6A is a timing diagram showing the read-out control performed when photographing an odd-numbered image, and FIG. 6B is a timing diagram showing the read-out control performed when photographing an even-numbered image. Note that the examples shown in FIGS. 6A and 6B illustrate the drive timing control for the image pickup device 304, when performing addition processing for adding a plurality of images.

Referring to FIG. 6A, at a time T_start, photographing of the first (i.e. odd-numbered) image is started to thereby input the vertical synchronization signal VD from the overall control and calculation section 312 to the timing generation section 313 and the first frequency divider 503. In response to this, at a time T0_o, the timing generation section 313 outputs a drive signal for reading out the first row of the image pickup device 304. At this time, the first frequency divider 503 resets the phase of the first clock signal CLK_DCDC to the initial phase in response to the vertical synchronization signal VD.

Further, since the first image is to be photographed, the overall control and calculation section 312 sets the selection signal ODDorEVEN to the H level. This causes the inversion/non-inversion selection section 505 to directly output the first clock signal CLK_DCDC without inverting the same.

As a consequence, the phase of the first clock signal CLK_DCDC at the start timing (time) T0_o of the control for reading out the first row is always fixed to a predetermined phase. In the illustrated example, the overall control and calculation section 312 controls the timing of resetting the first clock signal CLK_DCDC such that, at the time T0_o, the phase of the first clock signal CLK_DCDC becomes 0 [rad].

Next, referring to FIG. 6B, at a time T_start', when photographing of the second (i.e. even-numbered) image is started, the vertical synchronization signal VD is input from the overall control and calculation section 312 to the timing generation section 313 and the first frequency divider 503. In response to this, at a time T0_e, the timing generation section 313 outputs a drive signal for reading out the first row of the image pickup device 304. At this time, the first frequency divider 503 resets the phase of the first clock signal CLK_DCDC to the initial phase in response to the vertical synchronization signal VD.

Further, since the second image is to be photographed, the overall control and calculation section 312 sets the selection signal ODDorEVEN to the L level. This causes the inversion/non-inversion selection section 505 to invert the first clock signal CLK_DCDC and output the signal as the first inverted clock signal CLK_DCDC.

As a consequence, the phase of the first inverted clock signal CLK_DCDC at the start timing (time) T0_e of the control for reading out the first row is always fixed to a predetermined phase in a state inverted from the state in which the first clock signal CLK_DCDC is output when the odd-numbered image is photographed. In the illustrated example, the overall control and calculation section 312 controls the timing of resetting the first clock signal CLK_DCDC such that, at the time T0_e, the phase of the first inverted clock signal CLK_DCDC becomes $\pi$ [rad].

As described above, in the first embodiment, the phase of the drive clock signal for driving the noise source can be controlled such that the initial phase $\theta 1$ when photographing the odd-numbered image and the initial phase $\theta 2$ when photographing the even-numbered image are always inverted from each other. As a consequence, it is possible to cancel out the horizontal stripe pattern noise when performing addition processing of a plurality of images (i.e. odd-numbered and even-numbered images), and thereby positively suppress the horizontal stripe pattern noise generated when a synthesized image is obtained by photographing a plurality of images.

Although in the first embodiment, the description has been given of the case where addition processing for adding two images is performed as an example, the first embodiment can be similarly applied to a case where addition processing for adding two or more images is performed.

Next, a description will be given of an example of a digital camera (hereafter simply referred to as the camera) as an image pickup apparatus equipped with an image processing device according to a second embodiment of the present invention. The camera as the image pickup apparatus equipped with the image processing device according to the second embodiment has the same configuration as the camera shown in FIG. 1, and hence description thereof is omitted.

In the above-described first embodiment, read-out control is performed by the timing controller shown in FIG. 5 when photographing odd-numbered and even-numbered images to thereby suppress horizontal stripe pattern noise generated by addition processing. On the other hand, in the second embodiment, the phase of a noise signal (i.e. noise source) occurring when photographing each image is controlled according to the total number of photographed images to thereby suppress horizontal stripe pattern noise. That is, in the second embodiment, the horizontal stripe pattern noise is suppressed by shifting the phase of the horizontal stripe pattern noise generated in each image by an equal amount of phase shift within a range of one repetition period thereof, to thereby average the horizontal stripe pattern noise, as described hereinafter.

Figure 7:
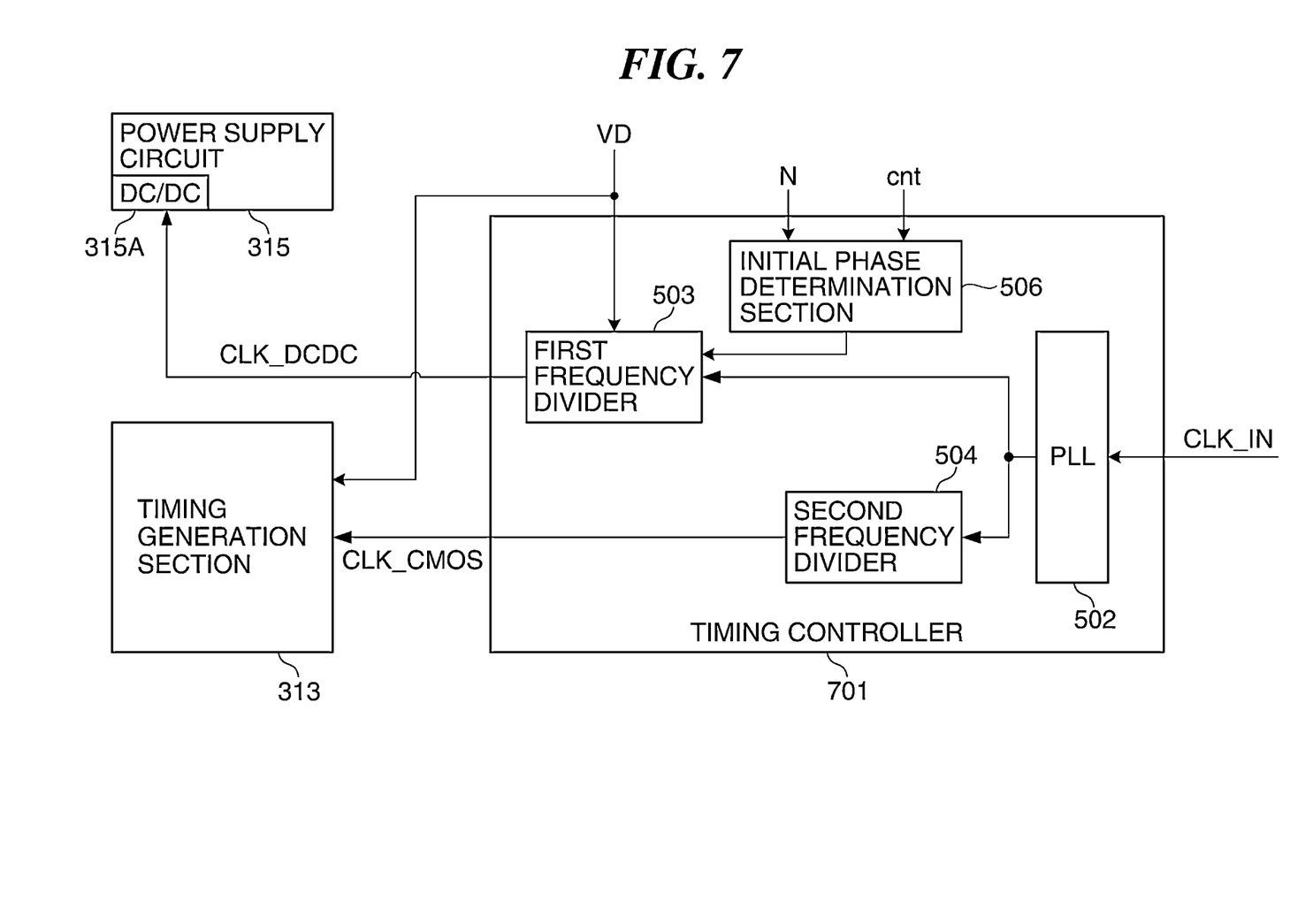
FIG. 7 is a block diagram of a timing controller used in a digital camera as an image pickup apparatus equipped with an image processing device according to a second embodiment of the present invention.

FIG. 7 is a block diagram of a timing controller used in the camera as the image pickup apparatus equipped with the image processing device according to the second embodiment.

Note that the illustrated timing controller, denoted by reference numeral 701, includes an initial phase determination section 506, described hereinafter, in place of the inversion/non-inversion selection section 505 appearing in FIG. 5, and has the same configuration in the other respects as the timing controller 501 shown in FIG. 5, and hence description thereof is omitted.

When photographing a plurality of images, a user inputs the total number N of images to be photographed using an operation section (not shown). The overall control and calculation section 312 sends the total number N of images to be photographed (N is an integer equal to 2 or larger) and a count signal cnt indicative of an ordinal number of an image to be photographed next, to the initial phase determination section 506. Then, the initial phase determination section 506 determines a count value, referred to hereinafter, according to the received total number N of images to be photographed and the count signal cnt.

Here, assuming that the total number N of images to be photographed is set to 4, and further, assuming that the frequency of the PLL clock signal is set to 16 MHz, and the frequency of the first clock signal CLK_DCDC is set to 1 MHz, the first frequency divider 503 frequency-divides the PLL clock signal into 16 to thereby generate the first clock signal CLK_DCDC having the frequency of 1 MHz. That is, when the counter circuit incorporated in the first frequency divider 503 counts up 16 times, it means that the first frequency divider 503 has completed outputting the first clock signal CLK_DCDC for one period.

When the total number N of images to be photographed is equal to 4, the initial phase determination section 506 sets the count value (also referred to as the setting value) y as y=16×(cnt−1)/4, according to the ordinal number of an image to be photographed next which is indicated by the count signal. This makes it possible to photograph each image by shifting the phase of the noise signal (noise source) by an equal amount of phase shift within a range of one repetition period thereof, at a start timing T0_cnt (shown as T0_1, T0_2, T0_3, and T0_4 in FIGS. 8A to 8D) of reading out the images.

Figure 8A:
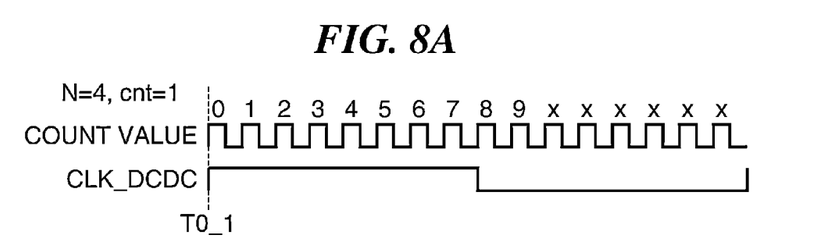
FIG. 8A shows the phase of a noise signal detected when a first image is photographed.
Figure 8B:
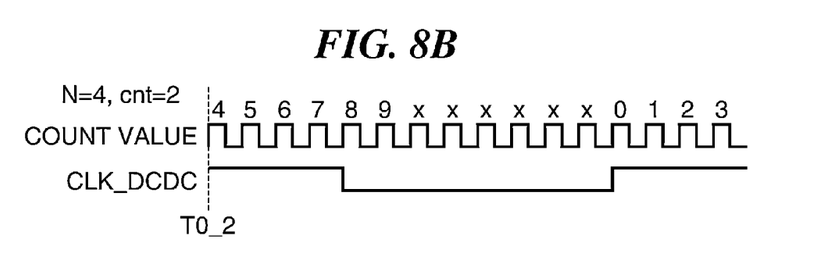
FIG. 8B shows the phase of a noise signal detected when a second image is photographed.
Figure 8C:
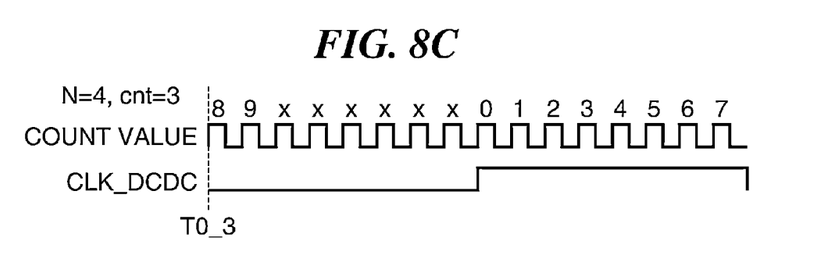
FIG. 8C shows the phase of a noise signal detected when a third image is photographed.
Figure 8D:
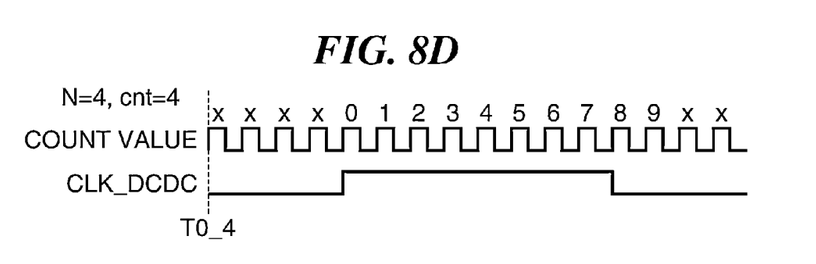
FIG. 8D shows the phase of a noise signal detected when a fourth image is photographed.

FIGS. 8A to 8D are diagrams useful in explaining the phase of the drive clock signal for driving the noise source, detected when photographing is performed by the camera as the image pickup apparatus equipped with the image processing device according to the second embodiment, in which FIG. 8A shows the phase of the drive clock signal for driving the noise source, which is used when a first image is photographed, FIG. 8B shows the phase of the drive clock signal for driving the noise source, which is used when a second image is photographed, FIG. 8C shows the phase of the drive clock signal for driving the noise source, which is used when a third image is photographed, and FIG. 8D shows the phase of the drive clock signal for driving the noise source, which is used when a fourth image is photographed.

When photographing the first image, the count signal cnt=1 holds, and hence the initial phase determination section 506 sets the count value y of the counter circuit included in the first frequency divider 503 as y=0. As a consequence, the phase of the first clock signal CLK_DCDC which is output from the first divider 503 is finalized as 0 [rad] at a start timing T0_1 of reading out the first row.

When photographing the second image, the count signal cnt=2 holds, and hence the initial phase determination section 506 sets the count value y of the counter circuit included in the first frequency divider 503 as y=4. As a consequence, the phase of the first clock signal CLK_DCDC which is output from the first divider 503 is finalized as $\pi/2$ [rad] at a start timing T0_2 of reading out the first row.

When photographing the third image, the count signal cnt=3 holds, and hence the initial phase determination section 506 sets the count value y of the counter circuit included in the first frequency divider 503 as y=8. As a consequence, the phase of the first clock signal CLK_DCDC which is output from the first divider 503 is finalized as $\pi$ [rad] at a start timing T0_3 of reading out the first row.

When photographing the fourth image, the count signal cnt=4 holds, and hence the initial phase determination section 506 sets the count value y of the counter circuit included in the first frequency divider 503 as y=12. As a consequence, the phase of the first clock signal CLK_DCDC which is output from the first divider 503 is finalized as $3\pi/2$ [rad] at a start timing T0_4 of reading out the first row.

As described above, by performing the read-out timing control, it is possible to shift the phase of the noise signal by an equal amount of phase shift within a range of one repetition period thereof, at the start timing of reading out each image, in a case where addition processing for adding the number N of images is performed.

As a result, in the second embodiment, the horizontal stripe pattern noise is generated in each image at a location which is shifted by an equal amount of phase shift, which is obtained by equally dividing one repetition period of the horizontal stripe pattern noise by the total number of images to be photographed. Therefore, it is possible to prevent the horizontal stripe pattern noise having the same phase from being added and emphasized in the synthesized image after addition processing, which makes it possible to suppress generation of the horizontal stripe pattern noise.

Note that the second embodiment can be applied not only to the case where addition processing for adding four images is performed, but it can be applied to a general case where a plurality of images are added.

Further, although in the first and second embodiments, the DC-DC converter circuit 315A is taken as an example of the noise source, the embodiments can be similarly applied to other circuits which are periodically driven.

Further, although in the first and second embodiments, the description has been given of the case where the processing operations from the phase control of the drive clock signal for driving the noise source to the conversion processing are performed by the camera, the processing operations may be performed such that only the phase control of the drive clock signal for driving the noise source is performed by the camera, and addition processing is performed by using e.g. an external apparatus. In this case, the overall control and calculation section 312 adds the phase information (i.e. phase information indicative of the phase of the first clock signal) of the noise source to each image, and records the image with the phase information added thereto e.g. in the storage medium 309. Then, the external apparatus may select an image to be subjected to addition processing according to the phase information.

In addition, although in the first and second embodiments, the description has been given of the case where the camera has one noise source as an example, the above-described read-out timing control can also be applied to a case where the camera has a plurality of noise sources.

As is clear from the above description, in the illustrated examples in FIGS. 1, 5, and 7, the overall control and calculation section 312, the timing generation section 313, and the timing controller 501 function as a drive unit, and the AFE 305 and the signal processor 306 function as an image processing unit. Further, the overall control and calculation section 312 and the timing controller 501 function as a control unit.

Further, the PLL 502 and the first frequency divider 503 function as a first generation unit, and the PLL 502 and the second frequency divider 504 function as a second generation unit. Further, the overall control and calculation section 312 and the inversion/non-inversion selection section 505 or the initial phase determination section 506 function as a timing unit.

Note that in the illustrated examples in FIGS. 1 and 5, at least the AFE 305, the signal processor 306, the overall control and calculation section 312, the timing generation section 313, and the timing controller 501 or 701 constitute the image processing device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-269328 filed Dec. 26, 2013, which is hereby incorporated by reference herein in its entirety.

What is claimed is:

1. An image processing device comprising:
   an image pickup device which outputs an image signal based on an optical image;
   a driver which drives the image pickup device;
   an image processor which synthesizes a plurality of image signals continuously obtained from the image pickup device to obtain a synthesized image;
   a first generator which generates a first drive signal for driving a circuit block other than the image pickup device;
   a second generator which generates a second drive signal for driving the driver; and
   a controller which causes a phase of the first drive signal and a phase of the second drive signal to have a predetermined relationship in a case where noise is added from the circuit block to each of the plurality of image signals.

2. The image processing device according to claim 1, wherein the predetermined relationship is a relationship in which the phase is inverted.

3. The image processing device according to claim 1, wherein said controller controls said first generator to reset the first drive signal to finalize the phase of the first drive signal, and controls said second generator to provide the second drive signal to said driver to start outputting of images from the image pickup device.

4. An image pickup apparatus including:
   an image processing device that comprises:
      an image pickup device which outputs an image signal based on an optical image;
      a driver which drives the image pickup device;
      an image processor which synthesizes a plurality of image signals continuously obtained from the image pickup device to obtain a synthesized image;
      a first generator which generates a first drive signal for driving a circuit block other than the image pickup device;
      a second generator which generates a second drive signal for driving the driver; and
   a controller which causes a phase of the first drive signal and a phase of the second drive signal to have a predetermined relationship in a case where noise is added from the circuit block to each of the plurality of image signals.

5. The image pickup apparatus according to claim 4, wherein the predetermined relationship is a relationship in which the phase is inverted.

6. The image pickup apparatus according to claim 4, wherein said controller controls said first generator to reset the first drive signal to finalize the phase of the first drive signal, and controls said second generator to provide the second drive signal to said driver to start outputting of images from the image pickup device.

7. A method of controlling an image processing device, the method comprising:

controlling a driver to drive an image pickup device to continuously output a plurality of image signals based on an optical image;

synthesizing the plurality of image signals to obtain a synthesized image;

generating a first drive signal for driving a circuit block other than the image pickup device;

generating a second drive signal for driving the driver; and causing a phase of the first drive signal and a phase of the second drive signal to have a predetermined relationship in a case where noise is added from the circuit block to each of the plurality of image signals.

8. A non-transitory computer-readable storage medium storing a computer-executable control program for causing a computer to execute a method of controlling an image processing device, wherein the method comprises:

controlling a driver to drive an image pickup device to continuously output a plurality of image signals based on an optical image;

synthesizing the plurality of image signals to obtain a synthesized image;

generating a first drive signal for driving a circuit block other than the image pickup device;

generating a second drive signal for driving the driver; and causing a phase of the first drive signal and a phase of the second drive signal to have a predetermined relationship in a case where noise is added from the circuit block to each of the plurality of image signals.

* * * * *